United States Patent [19]

Wayne, Sr. et al.

[11] Patent Number: 5,340,398
[45] Date of Patent: Aug. 23, 1994

[54] FOLIAGE COATING METHOD AND APPARATUS

[76] Inventors: Jack L. Wayne, Sr.; Jack L. Wayne, Jr., both of 421 Prairie Lake Cove, Altamonte Springs, Fla. 32701

[21] Appl. No.: 45,327

[22] Filed: Apr. 8, 1993

[51] Int. Cl.⁵ .............................................. B05C 3/00
[52] U.S. Cl. ..................................... 118/58; 118/602; 118/DIG. 7; 34/203; 34/208
[58] Field of Search ...................... 118/58, 64, 65, 429, 118/602, DIG.7; 34/17, 18, 203, 208; 198/346.3, 465.4, 339.1

[56] References Cited

U.S. PATENT DOCUMENTS

| | | | |
|---|---|---|---|
| 1,424,969 | 8/1922 | White | 34/203 |
| 2,121,370 | 6/1938 | Touton | 34/208 |
| 2,953,867 | 9/1960 | Bussert | 427/4 |
| 3,137,396 | 6/1964 | Winstead | 34/208 |
| 3,192,052 | 6/1965 | Cunning et al. | 426/307 |
| 3,262,420 | 7/1966 | Bossi et al. | 118/64 |
| 3,358,386 | 12/1967 | Perry, Jr. | 34/208 |
| 3,645,375 | 2/1972 | Gelzer | 198/346.3 |
| 3,760,927 | 9/1973 | Zambon | 198/346.3 |
| 4,069,764 | 1/1978 | Teyssedre | 198/339.1 |
| 4,279,215 | 7/1981 | Schäfer | 118/501 |
| 4,430,956 | 2/1984 | Koch, II | 118/DIG. 7 |
| 4,911,099 | 3/1990 | Ohmura et al. | 118/501 |
| 5,012,918 | 5/1991 | Acker et al. | 198/465.4 |
| 5,060,594 | 10/1991 | Tomioka et al. | 118/64 |
| 5,078,928 | 1/1992 | Balster et al. | 118/501 |
| 5,147,690 | 9/1992 | Faust et al. | 118/58 |
| 5,168,645 | 12/1992 | Robin et al. | 198/465.4 |

Primary Examiner—James C. Housel
Assistant Examiner—Laura E. Collins
Attorney, Agent, or Firm—William M. Hobby, III

[57] ABSTRACT

A foliage coating and treating apparatus is provided for treating plants with a coating in a manner which advantageously removes excess coating from plants passing through the apparatus. The apparatus includes a coating stage wherein the plants are coated with a coating and a hanging stage wherein the plants are hung on a conveyor. The apparatus further includes a blowing stage wherein the plants are blown with air to promote drying and removal of excess coating and/or preserving liquid. To remove excess coating from the plants, the apparatus includes a coating removal stage which employs a booth having first and second opposed side surfaces between which the plants pass on the conveyor. The booth also includes a plurality of first air vents situated on the first side surface and a plurality of second air vents situated on the second side surface, each of the first air vents being laterally staggered with respect to the second air vents. An air supply is coupled to the first air vents and the second air vents for forcibly supplying air therethrough, such that air exiting the first air vents and the second air vents causes the plants passing through the booth on the conveyor to shake to remove excess coating therefrom. The foliage coating apparatus also includes a foliage treating and drying stage wherein the plants are heated and blown to dry the coating on the plants.

2 Claims, 4 Drawing Sheets

FOLIAGE COATING METHOD AND APPARATUS

BACKGROUND OF THE INVENTION

This invention relates in general to foliage coating and treating systems, and more particularly, to automated foliage coating and treating systems.

Artificial plants have become increasingly more realistic in recent years. Unfortunately however, even the best silk artificial plants still do not appear completely natural and lifelike upon close examination and scrutiny. To address this problem and to provide an alternative to artificial plants, techniques have been developed for preserving real plants and foliage. These techniques typically involve coating a live plant with various plastic surface coatings which act to preserve the plant.

To coat or treat plants in commercially reasonable quantities, partially automated assembly line techniques have been developed. Such techniques include the steps of manually dipping the plant in the protective and/or cosmetic coating, manually shaking any excess coating off the plant and then drying the plant. An overhead conveyor is used to transport the plant from step to step. In a typical installation, as many as 5 to 10 workers are required to manually shake excess coating from the plants before the plants are attached to the conveyor. This excess coating removal step tends to be very time consuming. Moreover, the quality of the excess coating removal can vary from worker to worker. Also, the manual shaking coating removal step tends to leave a large amount of undesired waste coating deposited in the work area.

As used herein, the term "coating" includes preservative coatings, cosmetic coatings and other liquids or sealers.

SUMMARY OF THE INVENTION

One object of the present invention is to provide a foliage coating and treating system which includes an apparatus for removing excess coating from coated foliage.

Another object of the present invention is to provide a foliage coating and treating system which removes excess coating from the coated foliage in a manner which reduces heat stress and which extends the longevity of the preserved state of the foliage.

Yet another object of the present invention is to provide a foliage coating and treating system which requires substantially fewer workers to process foliage.

Still another object of the present invention is to provide a foliage coating and treating system which substantially eliminates quality variance in the removal of excess coating from coated foliage.

Another object of the present invention is to provide a foliage coating and treating system which leaves less waste coating deposited in the work area.

In accordance with the present invention, a foliage coating and treating apparatus is provided which includes a plurality of stages in which plants are processed. The apparatus includes a conveyor for transporting plants from stage to stage through the apparatus. The apparatus also includes a coating stage wherein the plants are coated with a protective coating. The apparatus further includes a hanging stage wherein the plants are hung on the conveyor. The apparatus still further includes a blowing stage wherein the plants are blown with air to promote drying and removal of excess coating. The foliage coating apparatus of the invention also includes a coating removal stage which employs a booth having an entrance and an exit with the conveyor passing therethrough. The booth includes first and second opposed side surfaces between which the plants pass on the conveyor. The booth also includes a plurality of first air vents situated on the first side surface and a plurality of second air vents situated on the second side surface, each of the first air vents being laterally staggered with respect to the second air vents. The booth further includes an air supply means, coupled to the first air vents and the second air vents, for forcibly supplying air therethrough, such that air exiting the first air vents and the second air vents causes the plants passing through the booth on the conveyor to shake to remove excess coating therefrom. The foliage coating apparatus of the invention also includes a drying stage wherein the plants are heated and blown to dry the coating on the plants.

BRIEF DESCRIPTION OF THE DRAWINGS

The features of the invention believed to be novel are specifically set forth in the appended claims. However, the invention itself, both as to its structure and method of operation, may best be understood by referring to the following description and the accompanying drawings.

DETAILED DESCRIPTION OF THE INVENTION

Figure 1:
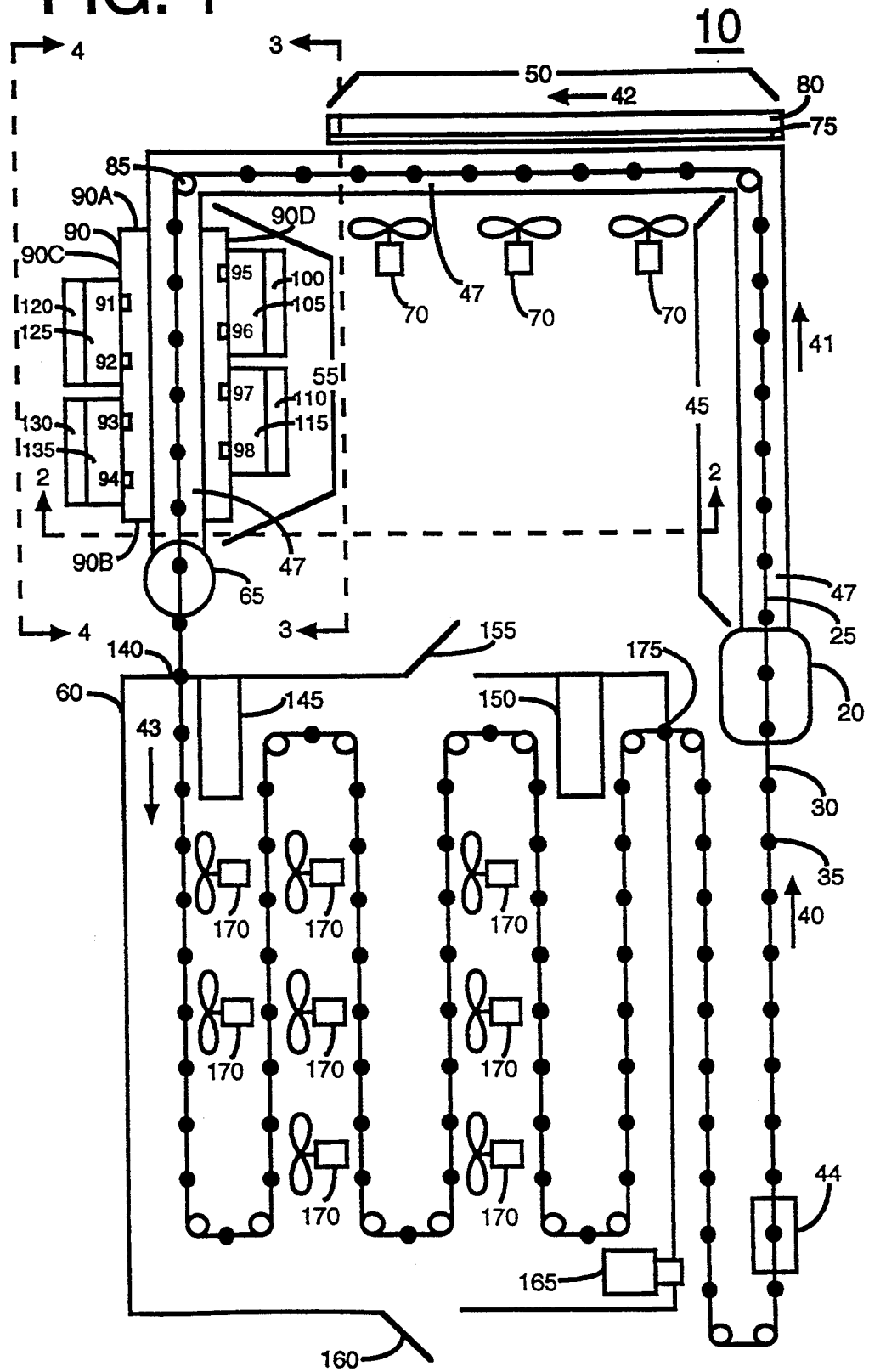
FIG. 1 is a top view of the foliage coating and treating system of the present invention.

FIG. 1 shows a top view of the foliage coating system of the present invention as system 10. System 10 includes a dipping tank 20 which contains a coating such as Extended Life Floral Coating manufactured by Innovative Coatings Technology, for example. It is again noted that, as used herein, the term "coating" includes preservative coatings, cosmetic coatings and other liquids and sealers.

Before further processing, the plants are first dipped in dipping tank 20 to cover the plants with the coating. After dipping, each plant is attached to an overhead conveyer 25 which is configured as a closed loop as shown in FIG. 1. Conveyor 25 is formed by a moving track 30 which includes a plurality of attachment fixtures 35, each attachment fixture being capable of holding one or more plants. Conveyor 25, with plants hung therefrom, moves in a counterclockwise direction as indicated by arrows 40, 41, 42 and 43. A reversible-variable speed drive motor 44 is coupled to conveyor 25 to drive track 30 and to propel the plants through system 10. Thus, while conveyor 10 is illustrated as moving in the counter-clockwise direction, it will be appreciated that conveyor 10 may be stopped and reversed to move clockwise should the need arise. System 10 includes hanging section 45 where the plants are manually attached to conveyor 25 as described above, and further includes a blowing section 50, a coating removal section 55 and a heating room or chamber 60, all of which are described in more detail subsequently.

A drain trough 47 extends from dipping tank 20 and along hanging section 45, blowing section 50 and coating removal section 55 of conveyor 25 to a coating reclaim reservoir 65. Trough 47 is substantially V-shaped or U-shaped and is positioned below the portion of conveyor 25 located at hanging section 45, blowing section 50 and coating removal section 55. Any excess coating which drips onto trough 47 from the plants attached to conveyor 25 as they pass through hanging section 45, blowing section 50 and coating removal section 55, flows back along trough 47 to reclaim reservoir 65 and to dipping tank 20. In this manner, excess coating is recovered and reused.

Figure 2:
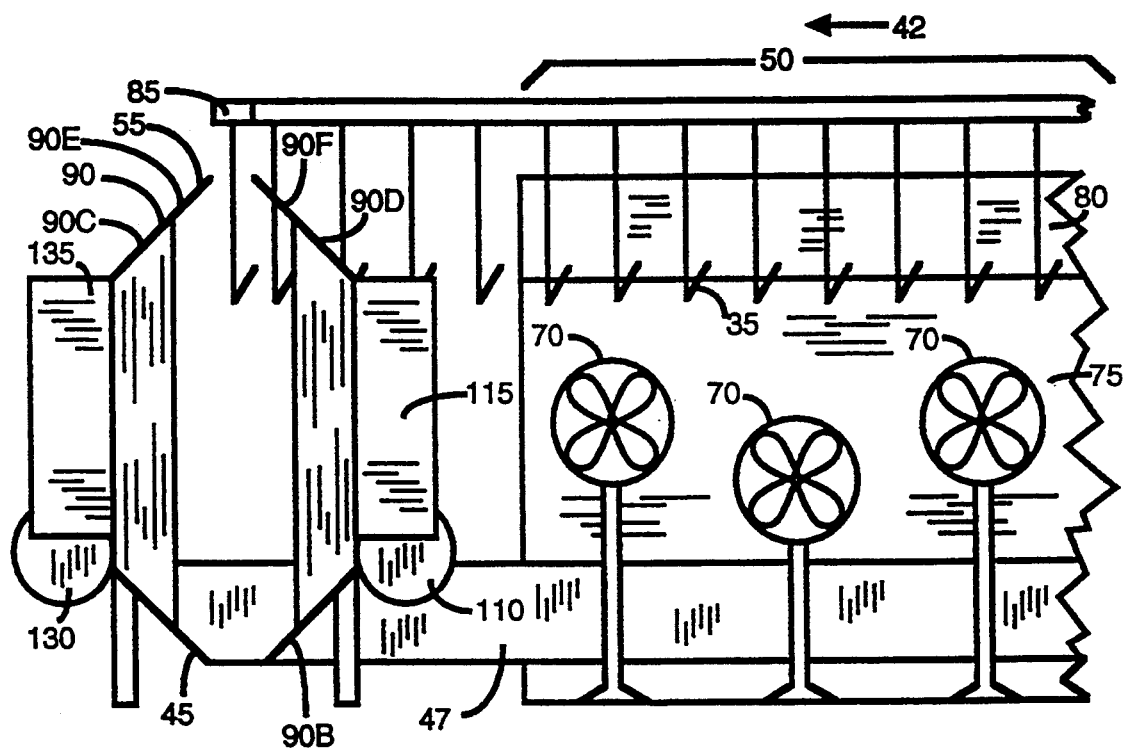
FIG. 2 is a cross section of the system of FIG. 1 taken along section line 2—2.

A cross section of system 10 taken along section line 2—2 is shown in FIG. 2. FIG. 2 is a front view of blowing section 50 and coating removal section 55. As plants exit hanging section 45 and enter blowing section 50, the plants encounter three fans or blowers 70 which blow air onto the plants. This blowing action starts the drying process of the plants and removes some excess coating from the plants. Excess coating which drips onto drain trough 47 as the plants pass through blowing section 50 flows to dripping tank 20 or coating reclaim reservoir 65 as described earlier. A backdrop 75 is situated in front of fans 70 and rearward of blowing section 50 as shown in FIG. 2. Backdrop 75 includes an air deflector 80 mounted at the top of backdrop 75 and at an angle of 45 degrees with respect thereto. In this manner, air from blowers 70 which passes the plants hung on attachment fixtures 35 hits backdrop 75 and deflector 80 and is deflected back to the plants for increased drying action and removal of excess coating.

Returning again to FIG. 1, it is seen that as plants on attachment fixtures 35 pass from right to left in the direction indicated by arrow 42 at blowing section 50, they pass by pulley 85. At that point they change direction and then enter coating removal section 55. Coating removal section 55 includes a booth 90 having opposed ends 90A and 90B which are open at the portion thereof through which trough 47 passes. To more clearly illustrate the interior of booth 90, the left top portion 90E and the right top portion 90F of booth 90 are omitted in FIG. 1. Booth 90 includes opposed side surfaces 90C and 90D which each include a plurality of air vents through which air is forcibly blown. More specifically, vents 91, 92, 93 and 94 are situated in spaced-apart relationship on booth side surface 90C, and vents 95, 96, 97 and 98 are situated in spaced-apart relationship on booth side surface 90D as shown in FIG. 1. Vents 91, 92, 93 and 94 are horizontally staggered with respect to vents 95, 96, 97 and 98. In other words, vent 91 on booth side surface 90C is laterally located approximately half way between vent 95 and 96 of booth side surface 90D. Vent 96 on booth side surface 90D is laterally located approximately half way between vent 91 and 92 of booth side surface 90C, and so forth.

A blower 100 is mounted to booth side surface 90D to forcibly blow air into a blower box 105 which directs the resultant air flow through vents 95 and 96. Similarly, a blower 110 is mounted to booth side surface 90D to forcibly blow air into a blower box 115 which directs the resultant air flow through vents 97 and 98. Blower 110 and blower box 115 may be seen more clearly in FIG. 2.

Returning to FIG. 1, on the opposite booth side surface 90C, a blower 120 is mounted on that booth side surface 90C to forcibly blow air into a blower 8 box 125 which directs the resultant air flow through vents 91 and 92. Similarly, a blower 130 is mounted to booth side surface 90C to forcibly blow air into a blower box 135 which directs the resultant air flow through vents 93 and 94. Blower 130 and blower box 135 may be seen more clearly in FIG. 2.

Figure 3:
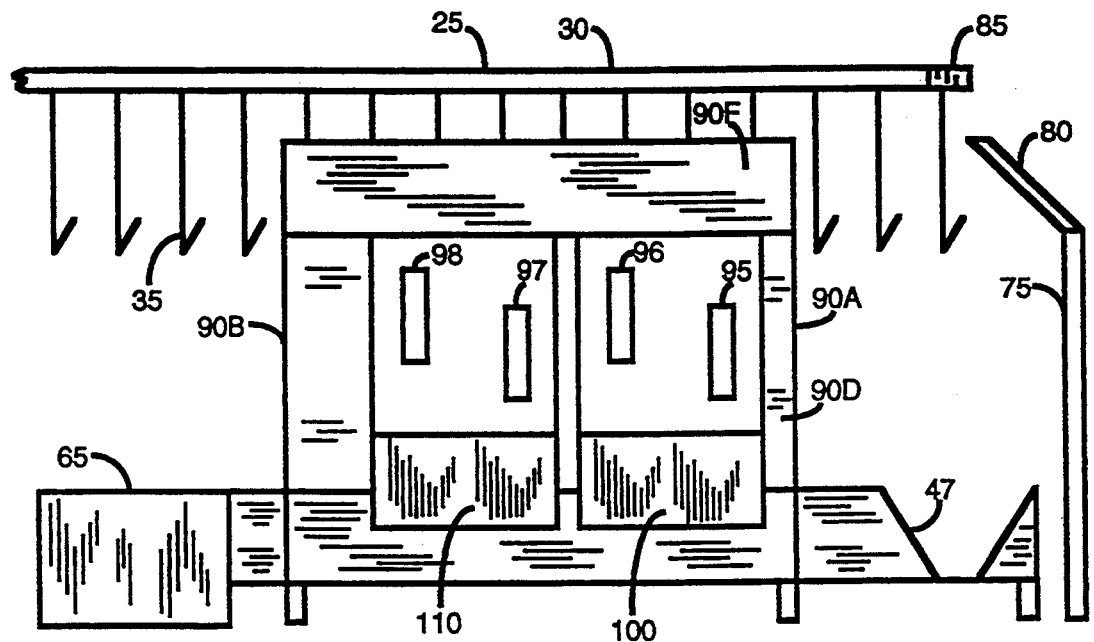
FIG. 3 is a cross section of the system of FIG. 1 taken along section line 3—3.

FIG. 3 shows a cross section of system 10 taken along section line 3—3 of FIG. 1. To enable vents 95, 96, 97 and 98 to be viewed, FIG. 3 depicts booth 90 with blower boxes 105 and 115 removed. In actual practice, blower box 105 would cover vents 95 and 96, and blower box 115 would cover vents 97 and 98. It is noted that alternating vents are vertically staggered in FIG. 3. That is, vents 95 and 97 are located lower than vents 96 and 98 by approximately half the vertical dimensions of such vents. Stated alternatively, each of vents 95, 96, 97 and 98 is vertically staggered or offset with respect to its neighboring adjacent vent.

Figure 4:
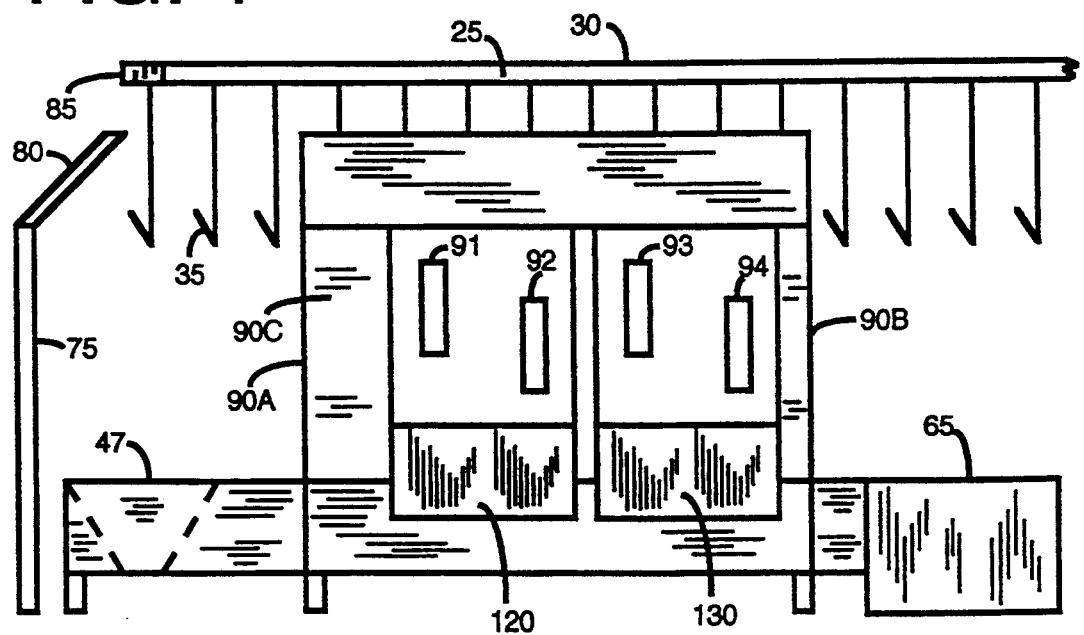
FIG. 4 is a cross section of the system of FIG. 1 taken along section line 4—4.

FIG. 4 shows a cross section of system 10 taken along section line 4—4 of FIG. 1. To enable vents 91, 92, 93 and 94 to be viewed, FIG. 4 depicts booth 90 with blower boxes 125 and 135 removed. In actual practice, blower box 125 would cover vents 91 and 92, and blower box 135 would cover vents 93 and 94. It is noted that again in FIG. 4, alternating vents are vertically staggered. That is, vents 92 and 94 are located lower than vents 91 and 93 by approximately half the vertical dimension of such vents.

Figure 5:
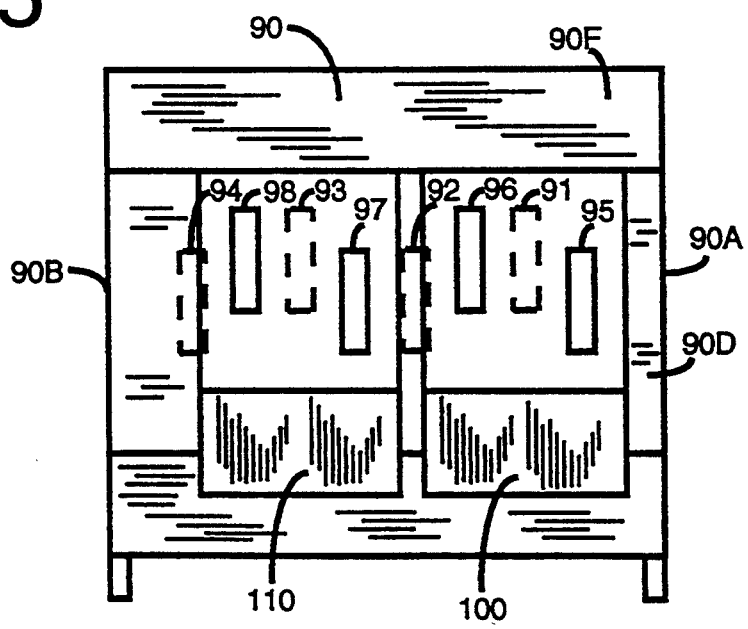
FIG. 5 is a side view of the coating removal section of the foliage coating and treating system of the present invention.

It is also noted that each of vents 91, 92, 93 and 94 on booth side 90C is vertically staggered or offset with respect to a corresponding horizontally aligned one of vents 95, 96, 97 and 98 on booth side 90D. FIG. 5 more clearly shows the spatial relationship of the vents on booth side surfaces 90C and 90D. More particularly, FIG. 5 is a side view of booth 90 showing side 90D with vents 95, 96, 97 and 98 therein. Vents 91, 92, 93 and 94 which are on the opposite side surface 90C are shown in dashed lines. It is noted that vent 95 is vertically staggered or offset with respect to vent 91 by approximately one half the height of such vents. Similarly, vent 96 is vertically staggered with respect to vent 92. Also, vent 97 is vertically staggered with respect to vent 93 and vent 98 is vertically staggered with respect to vent 94, all as shown in FIG. 5. In this manner, the following vent pairs are formed: vent pair 91-95, vent pair 92-96, vent pair 93-97 and vent pair 94-98. The respective vents of each vent pair are vertically staggered in the manner described above.

The spatial relationship of the above described air vents causes the plants passing though booth 90 to be subjected to a shaking action created by the air forced through each of such air vents. This shaking action causes excess coating to be removed from the plants. The excess coating falls into trough 47 within booth 90 and flows into reservoir 65. The shaking and blowing action within booth 90 also enhances drying of the coating on the plants.

Upon exiting booth 90 at end 90B as seen in FIG. 1, the plants enter a heating room or chamber 60 at entrance 140. Heating room 60 includes heaters 145 and 150 which heat the plants as they pass through room 60 on conveyer 25. When system 10 is in use, doors 155 and 160 are closed to promote heating within room 60. An exhaust blower 165 is situated in room 60 as shown in FIG. 1 to exhaust excess heat therefrom. A plurality of fans or blowers 170 are situated in spaced apart relationship along conveyor 25 within heating room 60 to promote drying of the plants by blowing action as they pass through room 60. The heat supplied to room 60 by heaters 145 and 150 also promotes the drying of the coating on these plants. After the drying of the coating on the plants is complete, the plants exit room 60 at exit 175. The dried processed plants are then removed from conveyor 25 manually. Room 60 is substantially sealed except for entrance 140, exit 175, exhaust blower 165 and doors 155 and 160.

Figures 6, 7:
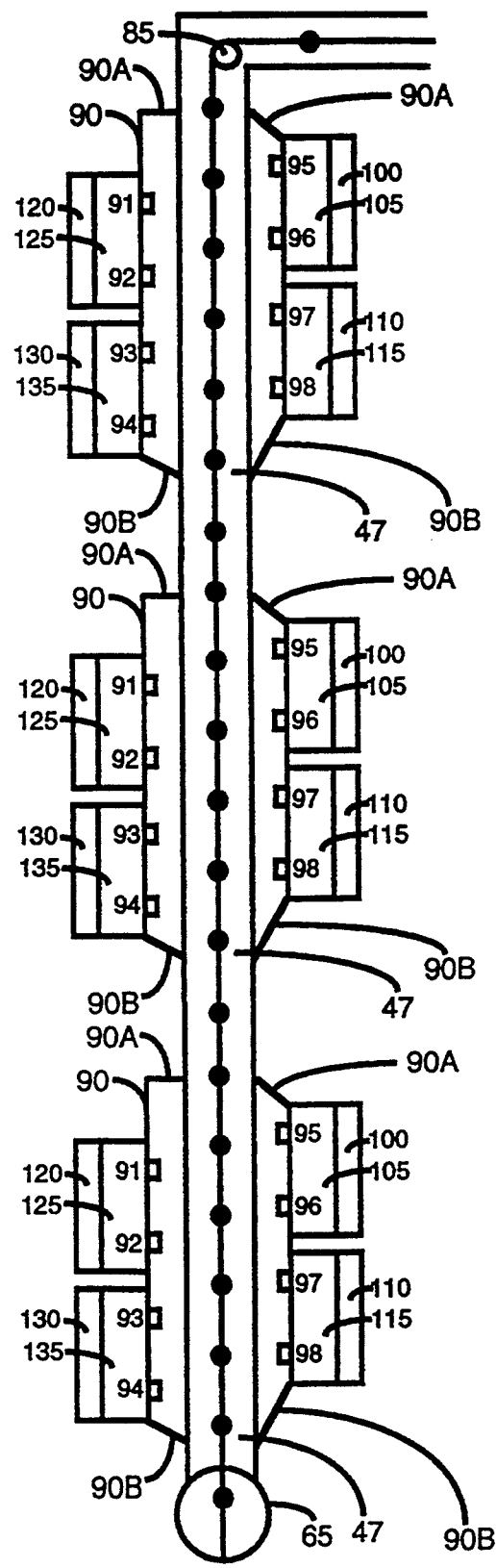
FIG. 6 is a top view of the coating removal section of another embodiment of the foliage coating system of the present invention.
FIG. 7 is a top view of another embodiment of the foliage coating and treating system of the present invention wherein a plurality of coating removal sections are cascaded.

FIG. 6 shows another embodiment of the invention wherein ends 90A and 90B of booth 90 are angled as illustrated.

FIG. 7 shows another embodiment of the present invention wherein a two or more booths 90 are cascaded. In the particular embodiment illustrated in FIG. 7, a series of three booths 90 are cascaded prior to the plants entering heating room 60. This cascaded arrangement allows the protective coating on the plants to dry faster and more evenly without the addition of large quantities of heat. In this embodiment, the booth 90 which is closest to pulley 85 is used principally to shake off excess coating on the plants passing therethrough. The booth 90 which is next in line on conveyor 47 and second closest to pulley 85 is used to spread the coating on the plants. The air flow in booth 90 most distant from pulley 85 is used to fluff the plants to prevent them from sticking together. One or more additional booths 90 may also be provided to the conveyer line after the plants have exited heating room 60.

While a foliage coating apparatus has been described above, it is clear that a method of coating foliage with a protective coating has also been disclosed. This method of coating plants with a protective coating includes the steps of coating the plants with a protective coating at a coating stage and hanging the plants on a conveyor which transports the plants from stage to stage. The method also includes the step of blowing the plants with air to promote drying and removal of excess coating at a blowing stage. The method further includes the step of shaking the plants at a shaking stage to remove excess coating from the plants by blowing the plants with air from a plurality of first air vents on an first surface and with air from a plurality of second air vents on a second surface parallel with the first surface. Each of the first air vents are laterally staggered with respect to the second air vents such that the plants are shaken by air exiting the first air vents and the second vents as the plants pass by the first air vents and the second air vents. The method still further includes the step of heating and blowing the plants to spread and dry the coating on the plants.

The foregoing has described an apparatus and method for coating plants with a protective coating, cosmetic coating, liquid or sealer. The foliage coating apparatus desirably removes excess coating from coated foliage in a manner which reduces heat stress and which extends the longevity of the preserved state of the foliage. The foliage coating apparatus advantageously requires substantially fewer workers to process foliage than conventional systems. Moreover, the foliage coating apparatus of the invention substantially eliminates quality variance in the removal of excess coating from coated foliage. The foliage coating apparatus also advantageously leaves less waste coating deposited in the work area.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. A foliage coating and treating apparatus including a plurality of stages in which plants are processed, said apparatus comprising:

a conveyor for transporting plants from stage to stage through said apparatus;

a coating stage including a coating tank wherein said plants are coated with a coating;

a hanging stage including means for hanging said plants on said conveyor;

a blowing stage including means for blowing said plants with air to promote drying and removal of excess coating;

a coating removal stage including
a booth having an entrance and an exit with said conveyor passing therethrough, said booth having first and second opposed side surfaces between which said plants pass on said conveyor;
a plurality of first air vents situated on said first side surface and a plurality of second air vents situated on said second side surface, each of said first air vents being laterally staggered with respect to said second air vents;
air supply means, coupled to said first air vents and said second air vents, for forcibly supplying air therethrough, such that air exiting said first air vents and said second air vents causes said plants passing through said booth on said conveyor to shake to remove excess coating therefrom, and a drying stage including means for drying said plants wherein said plants are heated and blown to dry the coating on said plants.

2. The foliage coating and treating apparatus of claim 1 further comprising a drip trough situated below said conveyor at said blowing stage and said coating removal stage to recover excess coating which drips from said plants.

* * * * *